United States Patent
Casale et al.

(10) Patent No.: US 7,484,641 B2
(45) Date of Patent: Feb. 3, 2009

(54) CLOSABLE OPENING DEVICE FOR PACKAGES OF POURABLE FOOD PRODUCTS

(75) Inventors: Cristiano Casale, Spilamberto (IT); Sara De Simoni, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 478 days.

(21) Appl. No.: 10/518,398

(22) PCT Filed: Sep. 8, 2003

(86) PCT No.: PCT/EP03/50614

§ 371 (c)(1), (2), (4) Date: Dec. 17, 2004

(87) PCT Pub. No.: WO2004/022437

PCT Pub. Date: Mar. 18, 2004

(65) Prior Publication Data

US 2005/0236425 A1 Oct. 27, 2005

(30) Foreign Application Priority Data

Sep. 9, 2002 (EP) .................................. 02425553

(51) Int. Cl.
*B65D 5/74* (2006.01)
(52) U.S. Cl. .................. 222/83.5; 222/87; 222/83; 222/541.2; 220/278
(58) Field of Classification Search .................. 222/81, 222/83, 83.5, 87–91, 541.2; 30/2; 414/412; 141/329, 330; 137/15.14; 221/30–32; 401/132–135; 220/277, 278
See application file for complete search history.

(56) References Cited

U.S. PATENT DOCUMENTS

| | | | |
|---|---|---|---|
| 2,561,903 A * | 7/1951 | Britton | 222/90 |
| 3,415,405 A | 12/1968 | Rausing et al. | |
| 3,883,034 A | 5/1975 | Rausing | |
| 3,900,155 A | 8/1975 | Rausing et al. | |
| 3,977,591 A | 8/1976 | Martensson et al. | |

(Continued)

FOREIGN PATENT DOCUMENTS

DE 38 32 412 C2 4/1989

(Continued)

*Primary Examiner*—J. Casimer Jacyna
(74) *Attorney, Agent, or Firm*—Buchanan, Ingersoll & Rooney, PC

(57) ABSTRACT

A closable opening device having a frame defining a through hole and fitted about a pierceable portion of a sealed package for pourable food products; a removable threaded cap which screws onto the frame to close the hole; and a tubular cutting member screwed inside the hole and rotated by the cap to travel through the pierceable portion. The cutting member has an end cutting edge, in turn having a main blade, and a number of teeth located behind the main blade and decreasing gradually in height so as to act successively on the pierceable portion.

10 Claims, 3 Drawing Sheets

U.S. PATENT DOCUMENTS

| | | |
|---|---|---|
| 3,999,678 A | 12/1976 | Ignell et al. |
| 4,078,688 A | 3/1978 | Nilsson et al. |
| 4,101,051 A | 7/1978 | Reil |
| 4,109,814 A | 8/1978 | Rausing |
| 4,113,101 A | 9/1978 | Pupp et al. |
| 4,140,235 A | 2/1979 | Rausing et al. |
| 4,149,651 A | 4/1979 | Ignell |
| 4,220,249 A | 9/1980 | Nilsson |
| 4,243,152 A | 1/1981 | Ignell |
| 4,310,128 A | 1/1982 | Morita et al. |
| 4,387,820 A | 6/1983 | Ignell |
| 4,391,385 A | 7/1983 | Rausing |
| 4,399,924 A | 8/1983 | Nilsson |
| 4,410,128 A | 10/1983 | Rausing |
| 4,483,464 A | 11/1984 | Nomura |
| 4,655,387 A | 4/1987 | Magnusson |
| 4,730,769 A | 3/1988 | Stark |
| 4,884,705 A * | 12/1989 | Debetencourt ............... 215/250 |
| 4,948,015 A | 8/1990 | Kawajiri et al. |
| 5,020,690 A | 6/1991 | Kishikawa et al. |
| 5,141,133 A | 8/1992 | Ninomiya et al. |
| 5,147,070 A | 9/1992 | Iwamoto |
| 5,199,618 A | 4/1993 | Reil et al. |
| 5,228,592 A | 7/1993 | Pellerano |
| 5,248,054 A | 9/1993 | Berggren et al. |
| 5,255,813 A | 10/1993 | Berggren et al. |
| 5,297,696 A | 3/1994 | Berstein et al. |
| 5,366,114 A | 11/1994 | Bernstein et al. |
| 5,372,300 A | 12/1994 | Nedstedt |
| 5,482,176 A | 1/1996 | Maietta et al. |
| 5,498,149 A | 3/1996 | Bengtsson |
| 5,498,225 A | 3/1996 | Nedstedt |
| D377,145 S | 1/1997 | Huser |
| 5,947,318 A | 9/1999 | Palm |
| 5,960,992 A | 10/1999 | Bernstein et al. |
| 6,077,021 A * | 6/2000 | Roman ........................ 414/412 |
| 6,279,779 B1 | 8/2001 | Laciacera et al. |
| 6,398,075 B1 | 6/2002 | Laciacera et al. |
| 6,820,764 B2 | 11/2004 | Miani et al. |
| 2002/0179605 A1 * | 12/2002 | Miani et al. .................. 220/277 |
| 2003/0127467 A1 | 7/2003 | Adams et al. |
| 2007/0062709 A1 * | 3/2007 | Berman ...................... 166/386 |

FOREIGN PATENT DOCUMENTS

| | | |
|---|---|---|
| DE | 43 43 816 | 6/1995 |
| EP | 0 328 652 | 8/1989 |
| EP | 0 385 603 | 9/1990 |
| EP | 1 088 764 | 4/2001 |
| EP | 1 088 765 | 4/2001 |
| EP | 1 262 412 B1 | 2/2006 |
| FR | 2 765 194 | 12/1998 |
| JP | 07 040982 | 2/1995 |
| JP | 8 11873 | 1/1996 |
| JP | 11-171233 | 6/1999 |
| JP | 11-222231 | 8/1999 |
| JP | 2000-344262 | 12/2000 |
| WO | WO 95/05996 | 3/1995 |
| WO | WO 03/002419 A1 | 1/2003 |
| WO | WO 03/101843 A1 | 12/2003 |

* cited by examiner

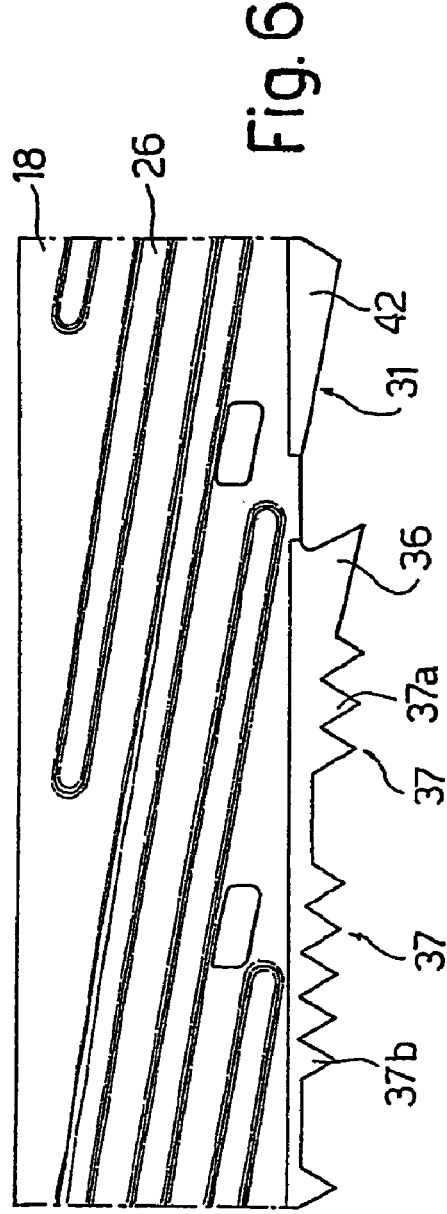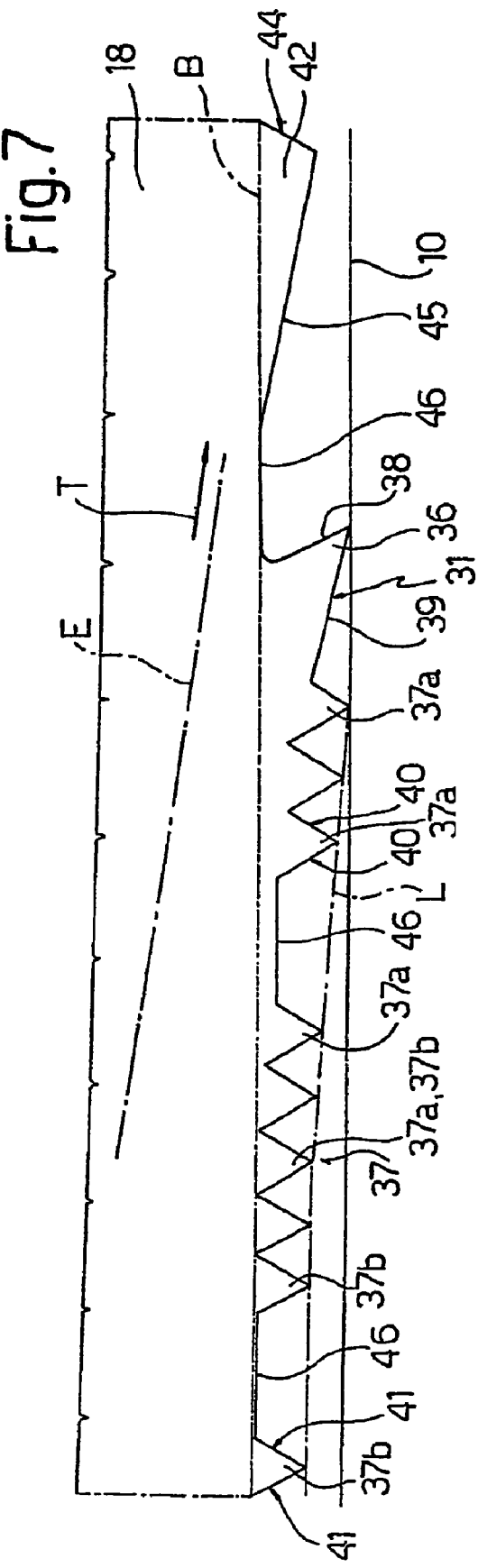

CLOSABLE OPENING DEVICE FOR PACKAGES OF POURABLE FOOD PRODUCTS

TECHNICAL FIELD

The present invention relates to a closable opening device for packages of pourable food products.

BACKGROUND ART

As is known, many pourable food products, such as fruit juice, UHT (ultra-high-temperature treated) milk, wine, tomato sauce, etc., are sold in packages made of sterilized packaging material.

A typical example of such a package is the parallelepiped-shaped package for liquid or pourable food products known as Tetra Brik Aseptic (registered trademark), which is produced by folding and sealing a web of laminated packaging material. The packaging material has a multilayer structure comprising a layer of fibrous material, e.g. paper, covered on both sides with layers of heat-seal plastic material, e.g. polyethylene; and, in the case of aseptic packages for long-storage products, such as UHT milk, the packaging material comprises a layer of oxygen-barrier material, e.g. aluminium foil, which is superimposed on a layer of heat-seal plastic material, and is in turn covered with another layer of heat-seal plastic material eventually forming the inner face of the package contacting the food product.

Such packages are normally produced on fully automatic packaging machines, on which a continuous tube is formed from the web-fed packaging material. The web of packaging material is sterilized on the packaging machine, e.g. by applying a chemical sterilizing agent, such as a hydrogen peroxide solution, which, after sterilization, is removed, e.g. vaporized by heating, from the surfaces of the packaging material; and the web of packaging material so sterilized is maintained in a closed sterile environment, and is folded and sealed longitudinally to form a vertical tube.

The tube is filled with the sterilized or sterile-processed food product, and is sealed and cut along equally spaced cross sections to form pillow packs, which are then folded mechanically to form the finished, e.g. substantially parallelepiped-shaped packages.

Alternatively, the packaging material may be cut into blanks, which are folded on forming spindles to form the packages, which are then filled with the food product and sealed. An example of this type of package is the "gable-top" package commonly known by the trade name Tetra Rex (registered trademark).

To open the above packages, various solutions have been proposed, one of which, known from U.S. Pat. No. 4,655,387 and No. 4,410,128, consists in forming, at a corner of a flap on the package, a preferential tear line defined by a succession of perforations extending through the outer layers of the packaging material down to the barrier material layer; and the package is opened by lifting the flap and cutting or tearing along the perforations. Needless to say, packages of this sort, once opened, cannot be closed again, and must therefore be handled with care to avoid spillage of the food product until the package is emptied.

To overcome this drawback, packages of the above type are fitted with closable opening devices, which substantially comprise a frame defining an opening and applied about a hole or a removable or pierceable portion in a wall of the package; and a cap hinged to the frame. The cap is normally molded integrally with the frame, and is initially sealed to the frame, along a peripheral edge surrounding the opening, by a thin breakable annular connecting portion. Once unsealed, the cap is movable between a closed position cooperating hermetically with the frame, and an open position. Alternatively, threaded caps separate from and initially screwed to the frame are also used.

One problem of opening devices of the type described is that the cap must be detachable from the frame with practically no effort required when unsealing the package. For which purpose, the opening devices are made of low-break-strength plastic material, normally polyethylene.

Polyethylene, however, has the drawback of failing to act as an effective oxygen barrier. On the side of the packaging material eventually defining the inside of the package, therefore, the hole is closed by an additional patch comprising a small sheet of heat-seal plastic material, and the opposite side of the packaging material is fitted with an oxygen barrier element, e.g. a pull-off tab, which is heat sealed to the patch and has a layer of aluminium.

Providing the packages with a patch and barrier element, however, calls for additional processing of the packaging material before it is sterilized and folded and sealed to form the vertical tube, so that the packages take longer, and hence are more expensive, to produce.

Moreover, once the cap is opened, access to the content of the package also involves removing the barrier element.

Closable opening devices have therefore been proposed by which the package can be opened in one operation, while at the same time ensuring an effective oxygen barrier.

In the solution described in International Patent Application WO 95/05996, such opening devices substantially comprise a frame having a cylindrical collar defining a pour opening and fitted about a pierceable portion of the package; a removable cap which is screwed externally to the frame collar to close the opening; and a substantially tubular cutting member screwed inside the frame collar and having an end edge with a number of substantially triangular end teeth, which cooperate with the pierceable portion of the package to detach it partly, i.e. with the exception of a small peripheral portion, from the relative wall.

The cutting member is operated by the cap via one-way ratchet-type transmission means activated when removing the cap from the collar, and spirals with respect to the frame from a raised rest position in which the end teeth face the pierceable portion, to successive lowered cutting positions in which the end teeth interact simultaneously with the pierceable portion.

A drawback of opening devices of the above type is that the cut part of the pierceable portion tends, in use, to at least partly clog the open section of the cutting member, and therefore the pour opening, thus interfering with outflow of the product from the package.

Moreover, for functional reasons, the cutting member is normally made of material (e.g. polypropylene) structurally more rigid than that of the frame and cap (normally polyethylene), thus possibility resulting in excessive fragility of the end teeth of the cutting member, which may snap off during transport and/or when unsealing the package, and so become dispersed in the food product.

These problems have been solved by the solution described in EP-A-1 088 765, wherein the end edge of the cutting member comprises a single cutting edge acting along a predominant peripheral portion of the pierceable portion of the package.

In addition to cutting, a single cutting edge moving spirally and acting along a predominant peripheral portion of the pierceable portion of the package also exerts thrust on the cut part of the pierceable portion, and tends to fold it inwards of the package and outwards of and eventually around the cutting member, thus preventing the cut part of the pierceable portion from interfering with outflow of the product from the package.

Moreover, using an appropriately designed single cutting edge enables a high degree of efficiency of the cutting member, which may therefore be made of less rigid material, e.g. the same as the cap and frame, and may advantageously be molded in one piece with the frame.

Though usable to advantage in most applications, the above solution is limited as regards the material from which the pierceable portion of the package is made. That is, when the pierceable portion is made of particularly tough material, such as a barrier material covered with a polymer catalyzed by means of an organometal or metallocene, the latter tends to "stretch" rather than tear under the action of the cutting edge, thus forming threadlike residue on the cutting edge, which may get into the food product.

DISCLOSURE OF INVENTION

It is an object of the present invention to provide a closable opening device designed to eliminate the aforementioned drawbacks typically associated with known devices.

According to the present invention, there is provided an opening device as claimed in claim 1.

BRIEF DESCRIPTION OF THE DRAWINGS

A preferred, non-limiting embodiment of the present invention will be described by way of example with reference to the accompanying drawings, in which:

FIG. 6 shows a spread-out flat view of the profile of the FIG. 4 cutting member;

FIG. 7 shows a larger-scale view of a detail in FIG. 6.

BEST MODE FOR CARRYING OUT THE INVENTION

Figure 1:
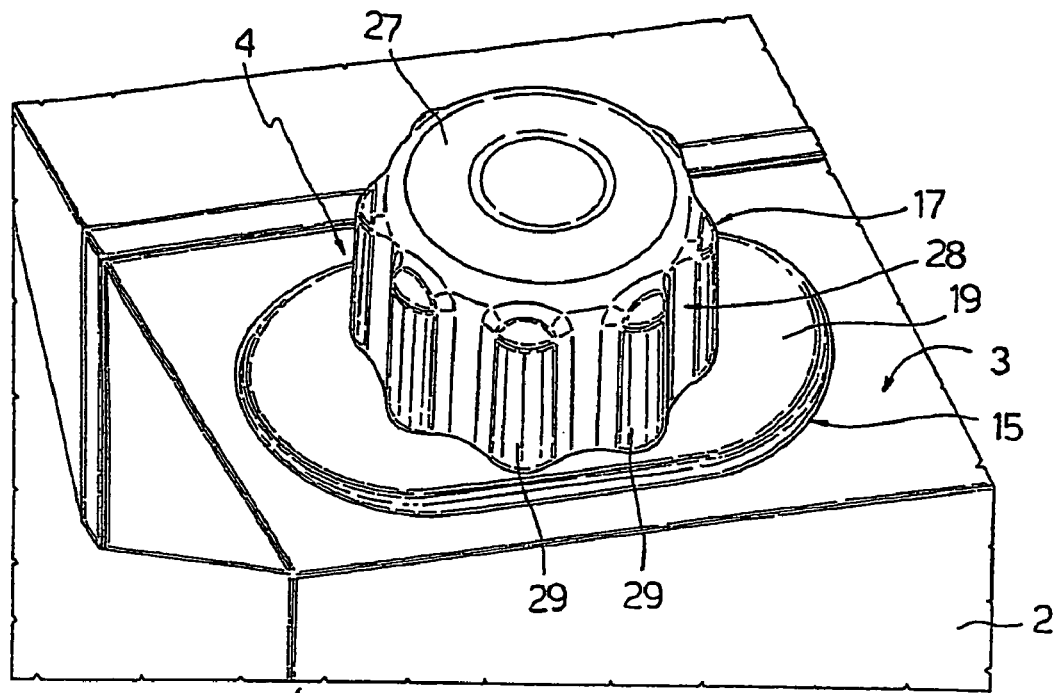
FIG. 1 shows a view in perspective of a top portion of a sealed package for pourable food products featuring a closable opening device in accordance with the present invention.

Number 1 in FIG. 1 indicates as a whole an aseptic sealed package for pourable food products, e.g. a parallelepiped-shaped package known as Tetra Brik Aseptic (registered trademark), which is made of sheet packaging material 2, and has a top wall 3 to which a closable opening device 4 of plastic material is applied by means of conventional fastening systems, e.g. adhesive substances or microflame or laser heat sealing techniques.

Packaging material 2 (FIG. 4) has a multilayer structure comprising, for example, a layer of paper material 5; an outer layer 6 of thermoplastic material, e.g. polyethylene; and a number of inner cover layers, hereinafter referred to as a whole as "inner covering 7". In the case of aseptic packages for long-storage products, such as UHT milk, fruit juice, etc., inner covering 7 typically comprises an intermediate barrier layer, e.g. of aluminium, in turn covered by one or more layers of thermoplastic material. The inner layer of thermoplastic material contacting the product in use is preferably defined by a low-linear-density (LLD) polyethylene catalyzed with a metallocene and of excellent mechanical strength and, in particular, a high stretch modulus.

Wall 3 has a pierceable portion 10 covered externally, in use, by opening device 4, and which is at least partly detached from wall 3 to permit outflow of 9 the product from package 1.

Figure 4:
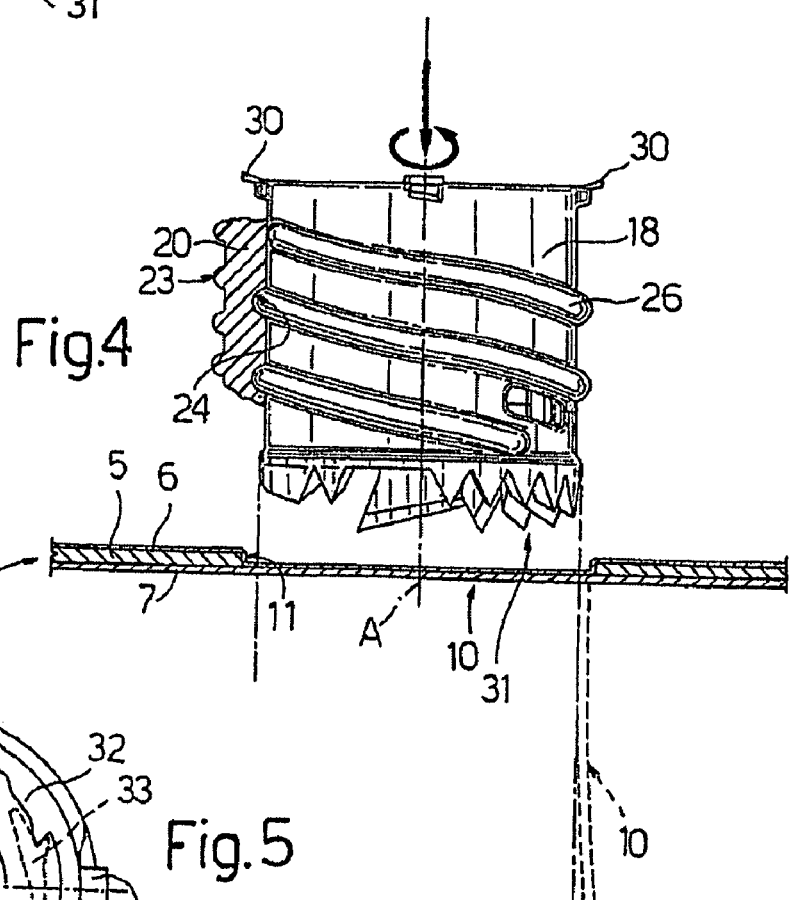
FIG. 4 shows a side view of a cutting member of the FIG. 1 device, positioned facing a pierceable portion of the package.

Pierceable portion 10 is preferably defined by a so-called "prelaminated hole", i.e. a hole 11 formed through the layer of paper material 5 prior to laminating outer layer 6 and inner covering 7, which therefore adhere to each other inside hole 11 and define pierceable portion 10 (FIG. 4).

Figure 2:
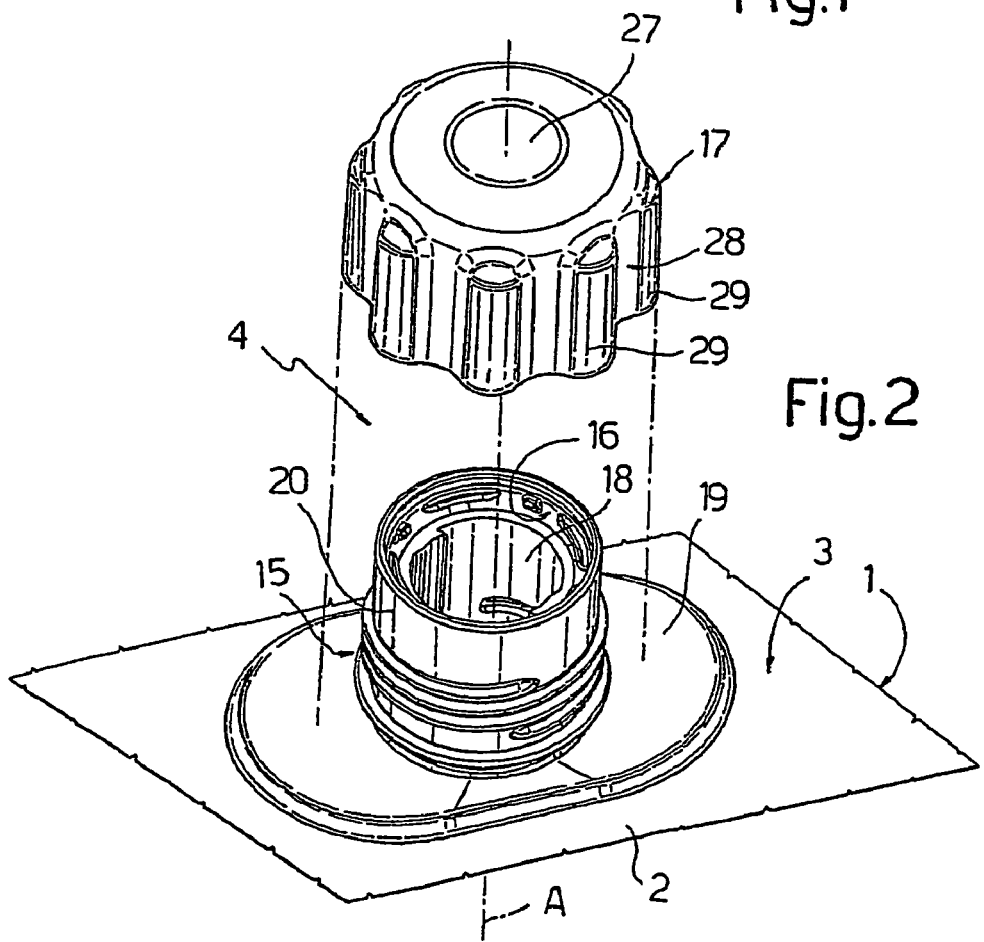
FIG. 2 shows a partly exploded view in perspective of the FIG. 1 opening device in an as-used condition.
Figure 3:
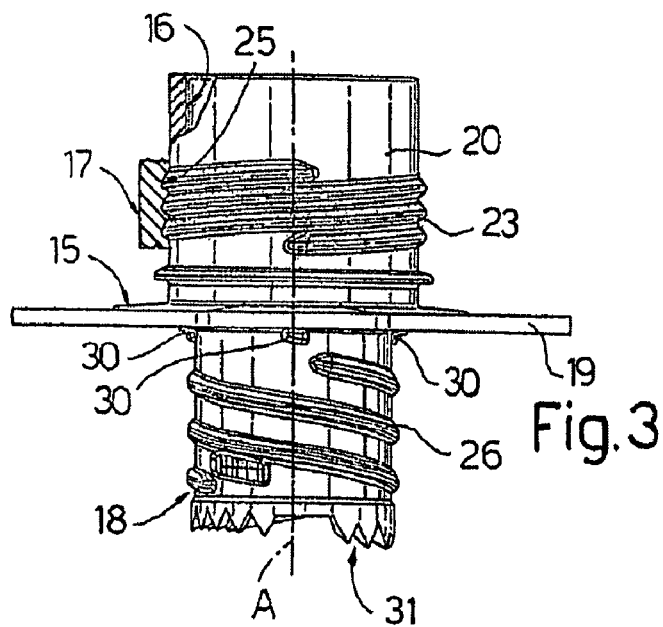
FIG. 3 shows a side view of a detail of the FIG. 1 device in a preassembly condition before being fitted to the package.

With reference to FIGS. 2 and 3, opening device 4 comprises a frame 15 fixed to package 1 about pierceable portion 10, and having a circular through hole 16 of axis A, through which the food product is poured; a cap 17 which is fitted coaxially to frame 15 to close opening 16; and a tubular cutting member 18 of axis A, which in use engages hole 16 in axially and angularly movable manner, and is activated by cap 17, as described in EP-A-1 088 765 incorporated herein by way of reference, to interact with pierceable portion 10 of wall 3 and unseal package 1.

Frame 15 comprises an annular base flange 19 fixed to wall 3 of package 1, about pierceable portion 10, and from whose radially inner edge projects axially a cylindrical collar 20, of axis A, defining hole 16.

Collar 20 has an outer thread 23 and an inner thread 24 (FIG. 4), which are oppositely inclined and engaged respectively, in use, by an inner thread 25 of cap 17 and an outer thread 26 of cutting member 18.

Conveniently, thread 23 is a conventional right-hand thread; and thread 24 is a left-hand, multi-start thread with a wider pitch than thread 23.

Cap 17 comprises a circular end wall 27; and a substantially cylindrical lateral wall 28 having inner thread 25 and outer projections 29 for easy grip.

Cap 17 and frame 15 are conveniently provided with tampering detecting means—not shown by being known and not forming part of the invention—for securing cap 17 and frame 15 in a position sealing package 1, and an example of which is illustrated in EP-A-1 088 765 referred to above.

Cutting member 18 is conveniently injection molded in one piece with the frame in the preassembly position shown in FIG. 3, in which one axial end of cutting member 18 is temporarily connected to flange 19 of frame 15 by a number of breakable radial bridges 30 surrounding hole 16. Cutting member 18 is screwed, in use, inside collar 20 of frame 15, and is conveniently driven axially into collar 20 before frame 15 is fitted to package 1.

Figure 5:
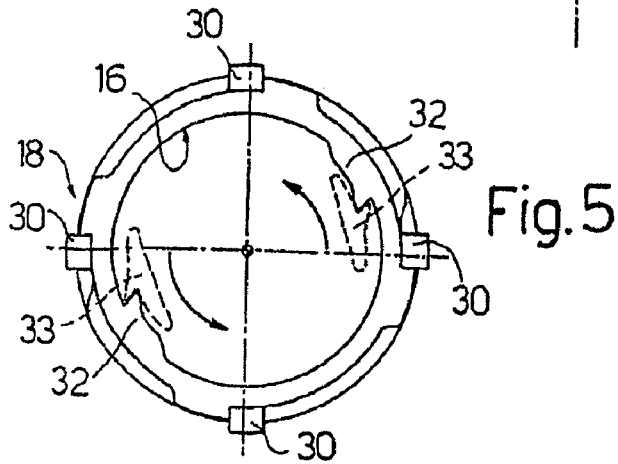
FIG. 5 shows a plan view of the FIG. 4 cutting member.

Cutting member 18 (FIG. 5) has two or more inner axial ribs 32 designed to cooperate with respective transmission members 33 projecting axially from end wall 27 of cap 17 and shown schematically by the dash lines in FIG. 5. Ribs 32 and transmission members 33 define a one-way transmission device—known from EP-A-1 088 765 and not described here in detail—by which cap 17 is connected rotationally to cutting member 18 in the cap unscrewing direction shown by the arrows in FIG. 5, but is disconnected in the opposite direction.

Cap 17 is also conveniently driven axially onto collar 20 when assembling opening device 4.

At the opposite axial end, cutting member 18 comprises a cutting edge 31 designed to interact with pierceable portion 10 of package 1 (FIG. 4).

According to the present invention, cutting edge 31 comprises, successively along its circumference, a main blade 36 and a number of teeth 37, as shown clearly in the spread-out flat view of cutting member 18 in FIG. 6, and in FIG. 7 showing a larger-scale view of the profile of cutting edge 31.

Main blade 36 is in the form of an asymmetrical triangle with one back-sloping side 38 facing in the cutting direction, and an opposite side 39 sloping slightly more than the slope of thread 26 indicated by line E in FIG. 7. The teeth, indicated as a whole by 37, may be divided into a first set 37a and a second set 37b.

Teeth 37a, which, proceeding along cutting edge 31 in the opposite direction to the rotation direction of cutting member 18, are located just behind main blade 36, each have a triangular profile with symmetrically sloping sides 40, and get gradually smaller in height with respect to a base line B of the profile of cutting edge 31. More specifically, the first tooth 37a, adjacent to main blade 36, is preferably the same height as the main blade, and the following teeth 37a decrease linearly in height so that teeth 37a contact pierceable portion 10 one after another. The slope of the line L through the apexes of teeth 37a is conveniently less than that of the thread, so that teeth 37a contact pierceable portion 10 are separate, spaced points.

Teeth 37b, located on the opposite side of teeth 37a to main tooth 36, i.e. after teeth 37a in the rotation direction of cutting member 18, each have a triangular profile with symmetrically sloping sides 41, and are of constant height—with respect to base line B of the profile of cutting edge 31—conveniently equal to that of the last tooth 37a, which may therefore also be considered the first tooth 37b.

Cutting edge 31 also comprises an auxiliary blade 42, which has a much larger circumference than teeth 37—preferably 3 to 7 times, and even more preferably about 5 times the width of each tooth 37—and is defined by a cutting side 44 facing in the traveling direction of cutting edge 31 with respect to pierceable portion 10, and having substantially the same slope as the sides of teeth 37, and by a guide side 45 sloping much less sharply and preferably having the same slope as side 39 of main blade 36.

Cutting edge 31 comprises three flat areas 46 withdrawn axially with respect to teeth 37 and blades 42, 36, and spaced circumferentially along edge 31. Areas 46, which are located along or close to base line B, have no cutting function, and serve as thrust surfaces for a tool (not shown) by which to drive cutting member 18 inside collar 20 as of the preassembly position.

Operation of opening device 4 will be described as of the sealed position shown in FIGS. 1 and 2 (in FIG. 2, cap 17 is shown detached for the sake of clarity) in which cutting member 18 is housed entirely inside collar 20, with cutting edge 31 facing the as yet uncut pierceable portion 10 (FIG. 4).

When rotated in the opening direction (anticlockwise in FIG. 5), cap 17—possibly after rotating idly to break the tampering detecting means—rotates cutting member 18 by transmission members 33 engaging ribs 32.

Given the opposite slope of threads 24 and 26, as cap 17 is unscrewed, cutting member 18 moves axially downwards to interact with pierceable portion 10.

To appreciate clearly the way in which cutting edge 31 interacts with pierceable portion 10, it should be pointed out, as shown in FIG. 7, that cutting edge 31 moves along a spiral path which, spread out flat, is tantamount to translation in a direction T forming, with the plane of pierceable portion 10, an angle equal to the slope of thread 26 and therefore parallel to line E.

Main blade 36 and first tooth 37a come into play first, simultaneously with each other. And once the material is pierced by main blade 36, the "hook" shape of main blade 36 "hooks up" the material and pulls it circumferentially to prevent any noticeable movement of the material under the axial component of the thrust exerted by the travel of cutting member 18, and so prevent the material from escaping the action of teeth 37a.

Teeth 37a come into play by degrees and in rapid succession to simulate the perforation which would be obtained with a vertical movement. Teeth 37a pierce the material and each cut the portion of material between its own point of contact and the incision made by the tooth 37a in front, so that cutting is not entrusted entirely to main blade 36, and horizontal stretching of the material is reduced.

Teeth 37b and secondary blade 42 come into play substantially simultaneously, and in turn first pierce the material and then make a continuous cut as the cutting member is rotated.

The cutting action of the cutting member terminates after one turn of cutting member 18—as of the position in which pierceable portion 10 is first contacted—which is sufficient for the cutting member to penetrate pierceable portion 10 axially down to base line B, and corresponds to a roughly 270° cut. The part of the pierceable portion which remains uncut and prevents it from being detached completely is the portion between the maximum penetration point of main blade 36 and the initial piercing point of secondary blade 42. Further rotation of cutting member 18 folds this portion axially outwards of cutting member 18, without cutting it, as shown schematically by the dash line in FIG. 4, so that pierceable portion 10 is moved clear of hole 16 in frame 15, and does not interfere with outflow of the food product from package 1.

As cap 17—which, in the meantime has made roughly a full turn about axis A—is unscrewed further, ribs 32 and transmission members 33 are disengaged axially, so that cutting member 18 is arrested in the lowered opening position projecting axially from frame 15 and inwards of package 1, but still connected to collar 20 by engagement of threads 24 and 26.

Cap 17 is screwed off completely to open package 1, which can be closed by simply screwing cap 17 back onto collar 20.

Once package 1 is unsealed, cutting member 18 can no longer be moved from the lowered opening position, by transmission members 33 being unable to reach an axial position in which to engage ribs 32 of cutting member 18, so that cutting member 18 holds the cut part of pierceable portion 10 back clear of hole 16.

Tests have shown that a cutting member 18 in accordance with the present invention provides for cutting pierceable portion 10 of package 1 without leaving any threadlike residue, even when using an inner covering of thermoplastic material with a high stretch modulus, and also for folding pierceable portion 10 correctly outwards of cutting member 18.

Clearly, changes may be made to opening device 4 as described and illustrated herein without, however, departing from the scope of the accompanying Claims.

The invention claimed is:

1. A closable opening device for a sealed package of a pourable food product, said device comprising:
   a frame fitted about a pierceable portion of said package and defining a through hole;
   a removable threaded cap which screws onto said frame to close said hole;
   a tubular cutting member engaging said hole and having an end cutting edge which cooperates with said pierceable portion to unseal said package;
   first connecting means for connecting said cap and said cutting member so as to rotate said cutting member during rotation of the cap to unscrew the cap off said frame when unsealing said package; and second connecting means for connecting said frame and said cutting member so as to move said cutting member along a spiral path through said pierceable portion in response to said rotation of said cap;

wherein said cutting edge comprises a main blade; and at least a number of first teeth which, proceeding along said cutting edge in the opposite direction to the direction of rotation of said cutting member, are located downstream from the main blade; said first teeth decreasing gradually in height so as to act successively on said pierceable portion;

wherein said cutting edge comprises a number of second teeth located on the opposite side of said first teeth to said main blade, and said second teeth are all the same height and are at most equal to the minimum height of said first teeth.

2. A device as claimed in claim 1, wherein said main blade has a cutting side facing in a traveling direction of said cutting member with respect to said pierceable portion and sloping backwards.

3. A device as claimed in claim 1, wherein the first teeth decrease linearly in height as of said main blade.

4. A device as claimed in claim 3, wherein said first teeth have respective ends lying along a line sloping less than said spiral path of said cutting member.

5. A device as claimed in claim 3, wherein one of said first teeth, located adjacent to said main blade, is the same height as said main blade.

6. A device as claimed in claim 1, wherein said frame comprises a cylindrical collar for receiving said cap and defining said hole; and in that said second connecting means comprise an inner thread of said collar and an outer thread of said cutting member.

7. A device as claimed in claim 1, wherein said frame and said cutting member are molded in one piece in a preassembly configuration in which they are joined coaxially with each other by breakable joining means.

8. A closable opening device for a sealed package of a pourable food product, said device comprising:

a frame fitted about a pierceable portion of said package and defining a through hole;

a removable threaded cap which screws onto said frame to close said hole;

a tubular cutting member engaging said hole and having an end cutting edge which cooperates with said pierceable portion to unseal said package;

first connecting means for connecting said cap and said cutting member so as to rotate said cutting member during rotation of the cap to unscrew the cap off said frame when unsealing said package; and second connecting means for connecting said frame and said cutting member so as to move said cutting member along a spiral path through said pierceable portion in response to said rotation of said cap;

wherein said cutting edge comprises a main blade including a cutting side that slopes backwards from a tip of the main blade in a direction opposite the direction of rotation of the cutting member; and at least a number of first teeth which, proceeding along said cutting edge in the opposite direction to the direction of rotation of said cutting member, are located downstream from the main blade; said first teeth decreasing gradually in height so as to act successively on said pierceable portion, wherein said cutting edge of said cutting member comprises a number of second teeth located on the opposite side of said first teeth to said main blade, and wherein said second teeth are all the same height, and are at most equal to the minimum height of said first teeth.

9. A device as claimed in claim 8, wherein said cutting edge of said cutting member comprises an auxiliary blade having a circumference which is 3 to 7 times the width of one of said first or second teeth.

10. A device as claimed in claim 9, wherein said auxiliary blade has a cutting side facing in the traveling direction of said cutting member, and having substantially the same slope as the sides of said first and second teeth.

* * * * *